Sept. 15, 1959 S. D. NOREM 2,904,384

MULTIPLE MODE RECORDING SYSTEM

Filed Dec. 26, 1957 2 Sheets-Sheet 1

INVENTOR.
STANLEY D. NOREM

BY John L. McLean

ATTORNEY

Sept. 15, 1959 S. D. NOREM 2,904,384

MULTIPLE MODE RECORDING SYSTEM

Filed Dec. 26, 1957 2 Sheets-Sheet 2

INVENTOR.
STANLEY D. NOREM

BY [signature]

ATTORNEY 2,904,384
Patented Sept. 15, 1959

2,904,384

MULTIPLE MODE RECORDING SYSTEM

Stanley D. Norem, Bayside, N.Y., assignor to The Perkin-Elmer Corporation, Norwalk, Conn., a corporation of New York Application December 26, 1957, Serial No. 705,320

4 Claims. (Cl. 346—23)

The present invention pertains to a multiple mode recording system especially conceived for use in conjunction with bar graph type of recording.

Certain kinds of cyclically repetitive time displaced signals contain information in both the amplitude of the signals and the time intervals therebetween. Once each signal has been identified, however, by reason of its characteristic time displacement, subsequent identification may be readily made by the order in which the signals appear within each cycle. Having been so ascertained, the characteristic time displacement of the signals may be discarded for uniform abscissa displacement of the recorded information, the ordinate information being displayed as straight-line displacements along the other axis of the recorded data. This produces a graphic recording known as a "bar graph type."

A bar graph recording system usually employs gating means which afford the selection of wanted time displaced signals and the elimination of other signals. The gate means may be a mechanical cam type of device, electromechanical or electronic switching means. Regardless of the particular kind of device, it is important that the gate means be properly adjusted so as to select only the wanted time displaced signals. It is equally important that the gate means operatively embraces the entirety of the wanted signal to produce a full ordinate displacement commensurate with each selected signal.

Bar graph recorder means also provides an automatic abscissa advance signal for driving the abscissa of the recorder a unit increment between the straight-line ordinate displacements of the bar graph.

It is the primary object of the present invention to afford verification of the selected component signals by confirming the proper adjustment of the gate means, as well as the proper operation of the automatic abscissa advance means of a bar graph recorder system.

Other objects, features, and advantages of the present invention will appear from an understanding of the disclosure of a typical embodiment as described hereinafter and illustrated in the accompanying drawings.

The present invention is directed to a bar graph recording system generally of the type disclosed in copending application S. N. 705,263 filed December 26, 1957 in the names of Horace G. McDonell and Emmett S. Watson.

Figure 1:
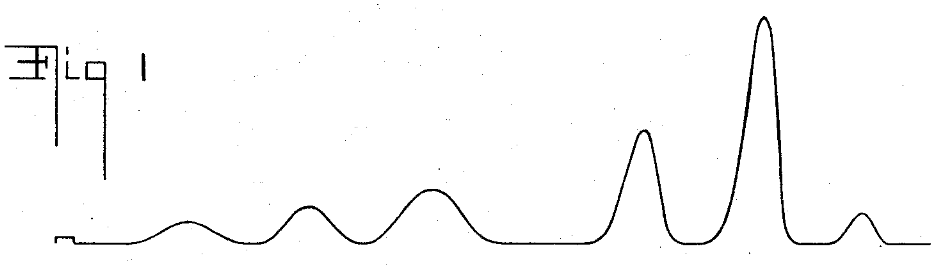
Fig. 1 is a typical recorded vapor fractometer signal.

The fractogram of Fig. 1 is typical of partition type of vapor fractometry. It is to be noted that the peaks which are indicative of the separate components of a sample which has been analyzed are displaced in time and generally have somewhat broader areas under the curve in the later components.

In the illustration of Fig. 1, the abscissa represents a uniform passage of time from right to left and the samples represented by the separate peaks are propane, isobutane, butane, isobutylene and butene, transbutene, and cisbutene.

The significant information contained in a vapor fractogram is the area under the curve of each separated component indication. Thus, peak height of itself is not wholly significant as to the percentage concentration of a component contained in a particular sample. However, in accordance with the teaching of the copending application of Horace G. McDonell and Emmett S. Watson, a recorder system embodying that system may be calibrated so as to read directly in percentage of concentration.

It is essential to accuracy, however, that the gate means employed in a bar graph recording system be properly set and adjusted to select only the wanted component signals and that the maximum peak height of such selected signals be fully recorded in the ordinate of the bar graph. Thus, as seen in Fig. 2, a bar graph recording corresponding to the fractogram of Fig. 1 has one straight-line ordinate spike corresponding to each component peak of Fig. 1.

Figure 3:
Fig. 3 is a bar graph recording of a number of components of the fractogram of Fig. 1.

In many instances, however, and in process vapor fractometer analyses especially, it is not always necessary to record measurements of all the separated components. Accordingly, several wanted component indications may be selected and the remaining input signals discarded, although the vapor fractometer instrument produces signals indicative of each component regardless of whether it is selected to be recorded or not. Fig. 3 illustrates a bar graph recording in which the first, fourth, fifth, and sixth component signals have been selected for recording.

It is the purpose of the present invention to afford a means of verifying and checking the proper selection of component signals as well as the proper coordination and operation of the automatic abscissa advance portion of a bar graph recording system.

Figures 2, 4:
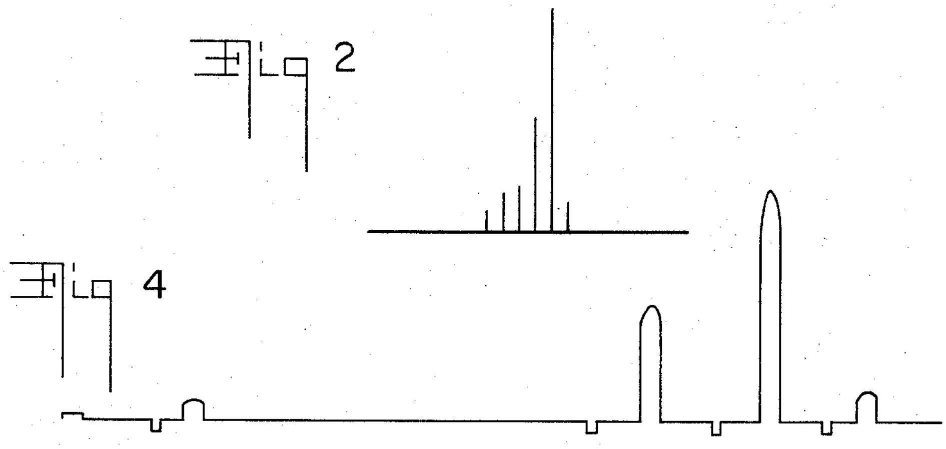
Fig. 2 is a bar graph recording corresponding to the fractogram of Fig. 1.
Fig. 4 is an illustration of a recording made in accordance with the check timing mode of operation of the present invention.

Fig. 4 illustrates the recorded signals of a system embodying the present invention and operating in the check timing mode. The graphic illustration of Fig. 4 illustrates the gating of the first, fourth, fifth, and sixth component signals. The automatic operation of the abscissa drive means by unit increment advances is indicated by negative signals below the baseline. Thus, in accordance with the teaching of the present invention, the setting of the gate means with respect to time may be adjusted and properly established, the selection of component signals positively ascertained, and the operation of the automatic abscissa advance means between recorded component signals confirmed.

Figure 5:
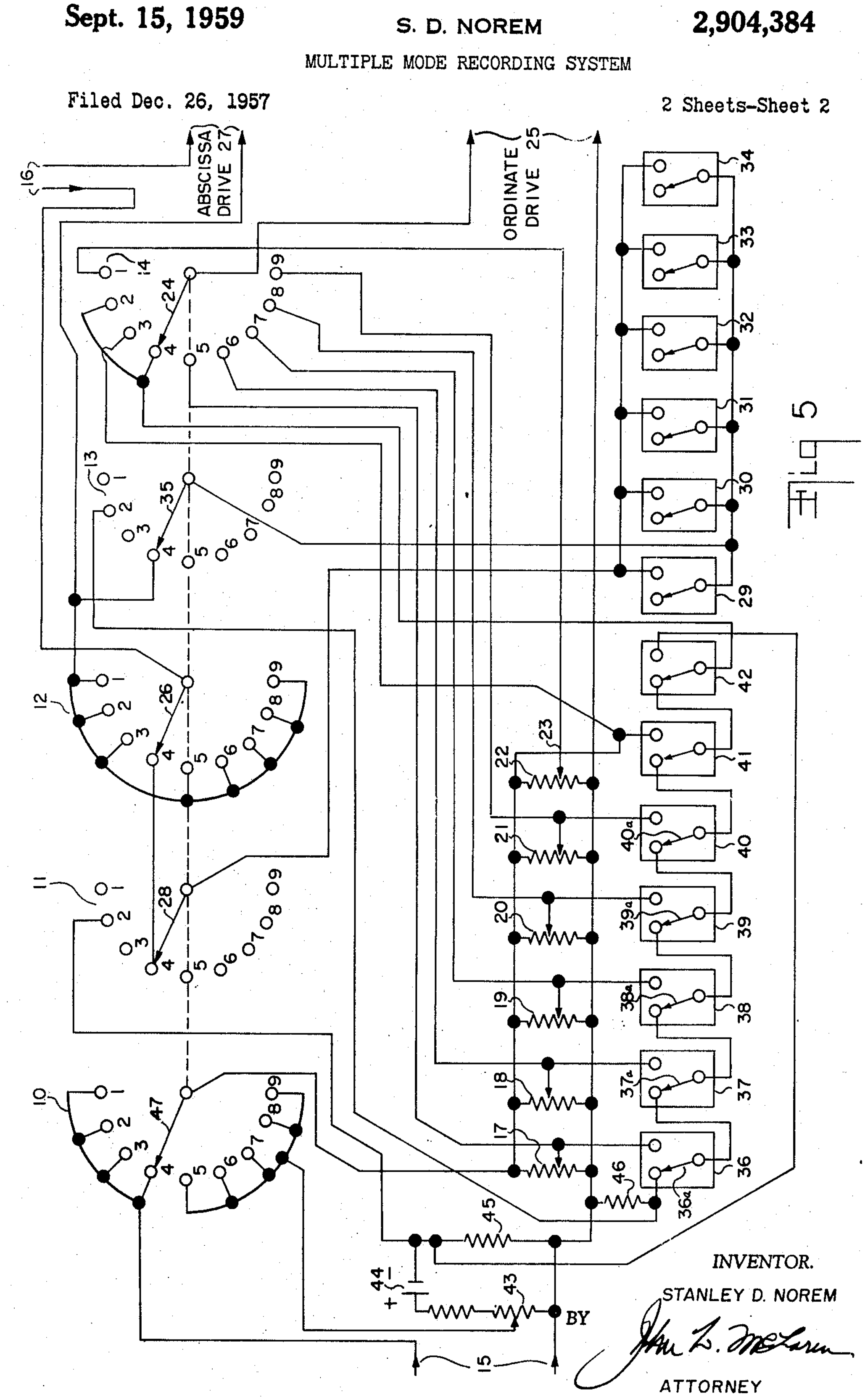
Fig. 5 is a schematic diagram illustrating an embodiment of the present invention.

As illustrated in Fig. 5, the present invention employs a multiple bank switching means as indicated at 10, 11, 12, 13, and 14. The multiple bank switching means illustrated in Fig. 5 has four positions for different modes of operation of the recorder system and has five additional positions affording the calibration of five different cyclically repetitive time displaced signals which form the input to the system. These positions are indicated by the numerals 1 through 9 on the five banks 10, 11, 12, 13, and 14 of the multiple switch.

The input to the recorder system is impressed across input terminals 15 and is fed to contacts 1, 2, 3, and 4 of the first bank 10 on the multiple switching means. A source of power 16 is provided to energize the abscissa drive means of the recorder (not shown). The output signals of the recording system of the present invention appearing at terminals 25 and 27 are impressed upon the ordinate drive and the abscissa drive means, respectively. Assuming that the switch means is in position one, it may be seen that the input signal appearing at terminals 15 is fed to the first switch bank, picked up by the wiper 17 from contact 1, and appears across the parallel-connected attenuators 17, 18, 19, 20, 21, and 22. An adjustable tap 23 connects a selected portion of the signal to the contact at position one of the fifth bank 14 of the multiple switch. With the wiper 24 in position one, the signal appears at terminals 25 and becomes the output for the recorder ordinate drive.

The abscissa drive output signal is provided by a source of energy 16 which is fed to the contact at position one of the third bank 12 of the multiple switching means, connected through tap 26, and appears at the output terminals 27 for the recorder abscissa drive.

In the normal fractogram mode of operation with the switch means in position one, the abscissa drive means is energized at a uniform rate with respect to time and the ordinate drive means is energized in accordance with the plurality of time displaced signals. The type of output provided by this mode of operation is graphically illustrated in Fig. 1.

When the conventional fractogram has been run, the various constituents of the sample may be identified by their retention time and, once having been so identified, may thereafter be recognized by the order in which they appear at terminals 15 as the input signals to the recorder system. The bar graph mode of operation of the present system is achieved with the multiple five-bank switch means in position four. With the switch means in position four, the input to the system appearing at terminals 15 is impressed upon the contact 4 of the first bank 10 of the multiple switch means and is picked up by tap 47 and impressed across the parallel connected variable tap attenuators 17, 18, 19, 20, 21, and 22. These attenuators are connected to an associated series of switches arranged so that the signal appearing across each of the attenuators 17 through 21 may be made to appear at the output terminals 25 to actuate the ordinate drive means and recorder.

Assuming that the recorder system has been operated in the conventional fractogram mode as illustrated in Fig. 1, a definite retention time has been established for each component of the sample mixture and it is known that a sample of the same kind injected into a process vapor fractometer will produce separated components eluting from the column after established periods of time. Accordingly, using the injection of a sample into a vapor fractometer column as an initial point of operation, timing means having a uniform advance with respect to time may be employed with mechanical cam, electromechanical gating means, or electronic switch means selectively adjusted to actuate each of the switches 36 through 40 at selected time intervals when different components of the sample are eluted from the vapor fractometer column. An operatively synchronized cam or other appropriate means actuates switch 36, and the contact arm 36*a* is moved to its right-hand position where it picks up the signal tapped from attenuator 17. From there, the signal is fed through the remaining switches 37 through 42 to position four of the fifth bank 14 of the multiple switch means. Tap 24 of the fifth bank 14 picks up the signal from contact 4 and it thus becomes the output appearing at the ordinate drive terminals 25.

After a properly predetermined and selected period of time, the cam or other appropriately adjusted switch actuating means moves the contact arm 37*a* of switch 37 to its right-hand position, disconnecting switch 37 from switch 36. In its right-hand position, switch 37 is connected to attenuator 18 and picks up that portion of the signal tapped by attenuator 18. Similarly, the contact arms of switches 38, 39 and 40 are each actuated to its right-hand position in timed sequence, coincident with the time displaced elution of a particular component of the sample being analyzed. The cam or other switch actuating means also performs the function of actuating switches 29 through 32 one at a time following each actuation of the switches 36 through 40. The switch actuating means is so designed as to actuate switches 29 through 32 for a fixed and uniform length of time. Thus, the power source 16 is connected through contact arm 26 of the third bank 12 of the multiple switch means to its contact 4 and through an electrical connection to contact 4 of the second bank 11. The contact arm 28 is connected to the energy source through contact 4 and impresses it for a unit length of time upon switches 29 through 32 which are parallel connected.

An abscissa drive signal is provided through contact arm 35 and contact 4 of the fourth bank 14 of the multiple switch means and appears at the abscissa drive output terminals 27. Since each of the switches 29 through 32 are actuated for a like period of time, the chart of the recorder is advanced a unit increment regardless of the actual time elapsed between components of the sample being eluted from the vapor fractometer.

This type of recording is known as "bar graph" and is shown in Fig. 2 of the drawings. It will be noted that Fig. 2 displays six components of the sample, each of which corresponds to a component of the sample as displayed in the normal fractogram of Fig. 1. As shown in Fig. 2, the ordinate amplitudes of corresponding components are the same as in Fig. 1 as also is the order of the components but, as has been previously explained, the record made possible by the use of the recording system is such that each of the ordinates displayed is separated by a unit increment, each of the components having been previously established and identified by a normal fractogram as shown in Fig. 1.

Another most important feature of the recording system is the arrangement by which each component signal may be calibrated to provide a more accurate and convenient direct reading measure of concentration of each component as explained by the vapor phase or other phenomena. For instance, it may be most important to discern the change or trend of a particular component of a sample which is repetitively analyzed by a vapor fractometer or other means providing a signal of similar characteristics. Each of the attenuators 17 through 21 may be set or adjusted so that the percentage concentration of a sample can be read directly from the bar graph fractogram. Typically, a particular component may be only five percent of the sample, quantitatively. Changes in such a relatively small concentration are not too apparent when recorded at five percent of full scale in the usual recording system. If five percent is represented by five scalar divisions, a one-tenth change in the five percent concentration will be represented by a nearly indiscernible one half of one scalar division. However, the amplitude of the signal produced by any particular component of a sample may be adjusted to an appropriate full scale value so that any change from the desired full scale value is readily evident from the recording produced. The manner in which this is accomplished is as follows:

In order to calibarte the first sample component, the multiple switch means is turned to position five and the signal appearing across a potentiometer 43 is picked up by the contact arm 47. The potential across potentiometer 43 is furnished by a suitable electrical source such as battery 44. The tap of potentiometer 43 is adjusted to match the amplitude of the first component as recorded in the normal fractogram such as Fig. 1. The tap of attenuator 17 is then adjusted to provide a full scale reading of appropriate and convenient amplitude relative to the concentration of that particular component in the sample, the amplitude of signals produced by other components, and the scale unit increments of the recorder with which the system is used. The adjusted signal tapped by attenuator 17 appears at contact 5 of the fifth bank 14 of the multiple switch means. Contact arm 24 picks up the adjusted attenuator signal and that signal provides the ordinate output at terminals 25.

In a similar manner, the multiple switch means is moved to position 6 and the amplitude of the next component signal, as ascertained from the normal fractogram of Fig. 1, may be matched by the adjustment of potentiometer 43 and thereafter attenuator 18 is adjusted to provide an appropriate full scale amplitude for the second component. The attenuators 19, 20, and 21 are similarly adjusted with the multiple switch in positions 7, 8, and 9 respectively. The latter three calibrations pertain to the third, fourth, and fifth sample components.

When set in position three, the multiple switch means effects circuit connections providing a "zero set" mode of operation indicative of over-all instrument sensitivity. This mode of operation is similar to the bar graph mode of operation except that switch 41 is actuated to its right-hand position connecting with attenuator 22. The signal appearing across attenuator 22 is fed through switch 41 and 42 to contact 3 of the fifth bank 14 of the multiple switch, and through contact arm 24 to terminals 25 as the recorder ordinate drive signal. In the zero set mode of operation, all time displaced signals are recorded at the same sensitivity and there is no calibration of individual signals such as that described hereinbefore.

In order to verify the proper selection of component signals and check the adjustment of the gate means as well as confirm the operation of the automatic advance means, the multiple switch means of the present invention is set at position two. The input signals to the recorder system of the present invention which appear at terminals 15 are picked up at contact 2 by a contact arm 47 of the first bank 10 of the multiple switch means and impressed in parallel across attenuators 17 through 22. The switch means 36 through 40 are sequentially actuated by gate means for a selected period of time and during each such actuation a selected component peak is recorded. Unlike the bar graph recording, however, the abscissa drive means of the recorder is being advanced at a uniform rate so as to produce selected recorded component signals as illustrated in Fig. 4.

The source connected across terminal 16 energizes contact 2 of the third bank 12 of the multiple switch means and is connected through contact arm 26 to contact 12 of the multiple switch means and appears at the output terminals 27 which actuate the abscissa drive of the recorder. Thus, the abscissa drive is energized at a uniform rate with respect to time in this mode of operation and, in this respect, is similar to abscissa operation in the conventional fractogram mode of recording.

As has previously been explained, the gate means operates each of the switches 29, 30, 31 and 32 in turn after actuation of the switches 36, 37, 38, and 39 respectively. In the check timing mode of operation, however, switches 29 through 32 have impressed upon them a signal of opposite sense to the ordinate displacement signal. In this particular embodiment that signal is of negative polarity and is obtained from the resistor 45 in circuit with battery 44, resistor 45 being connected to contact 2 of the second bank 11 of the multiple switch means. Contact arm 28 picks up the negative potential from contact 2 and impresses it across parallel connected switches 29 through 34.

When each of the switches 29 through 34 is actuated to its right-hand position, a negative signal appears at contact arm 35 of the fourth bank 14 of the multiple switch means. A negative signal is thus connected with contact 2 and appears across a resistor 46 whence it appears at the output terminals 25 which actuate the ordinate drive means of the recorder.

In accordance with the teaching of the present invention, the check timing recording as illustrated by Fig. 4 affords a means of adjusting the gate means of the timing mechanism so as to embrace the maximum peak height of selected component signals which actuate the recorder system. Similarly, the selection of component signals may be verified or changed readily through use of the check timing mode of operation of the present invention.

Figure 6:
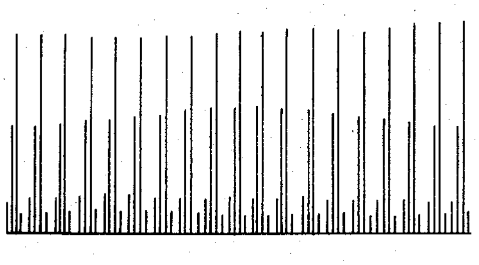
Fig. 6 is an illustration of repetitive bar graph signals recorded from the information obtained by the cyclically repetitive analyses performed by a process vapor fractometer instrument.

The proper selection of signals and adjustment of the bar graph recording system having been verified, cyclically repetitive analyses provide a continuing bar graph recording of the kind illustrated in Fig. 6. Fig. 6 illustrates the four selected components repetitively recorded in the course of periodic repetitive process analyses. The bar graph recording affords a convenient and readily recognizable indication of the trends in changes of concentration of particular sample components. As readily appears from the illustration of Fig. 6, the trend of several different components may be immediately ascertained and information provided by which an operator may correct and adjust process performance. Alternatively, the output signals may be derived to effect automatic correction and adjustment of the process through suitable servomechanism means.

By appropriate calibration achieved in the manner disclosed in the McDonell and Watson application, percentage changes in concentration of each component may be head directly from the bar graph recording of Fig. 6. The check timing feature of the present invention insures accuracy of the recorded signals by eliminating the possibility that a wrong component signal is selected or only a portion of the peak signal is recorded in bar graph form.

At any appropriate time, the recording system of the present invention may be switched to check timing mode of operation to confirm the operation of repetitive bar graph recordings of a process stream. The source sampling means, timing mechanism, and gating means may be employed for the check timing operation. The process stream analysis thus continues uninterrupted and the selection of component signals may be checked on the same recorder chart. Similarly, the check timing may be used to change from one selected component signal to another.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

I claim:

1. Apparatus for recording a plurality of cyclically repetitive time displaced signals as a bar graph comprising a recorder having ordinate and abscissa drive means, multiple adjustable means for gating said time displaced signals during selected time intervals, means responsive to each gating operation for producing a signal suitable for advancing said abscissa drive means a unit increment, switch means connected to receive said last-named signals and said gated time displaced signals, said switch means including means for connecting said gated time displaced signals to said recorder ordinate drive means and connecting said abscissa advance signal to said abscissa drive means in a first position of the switch, and means for verifying the selection of said time displaced signals and the adjustment of said multiple gate means by connecting a source of energy adapted to actuate said abscissa drive means at a constant rate with respect to time and connecting both said gated time displaced signals and said abscissa advance signals to said ordinate drive means in a second position of the switch whereby to record a graphic representation of the operation of said multiple gate means and said automatic advance means relative to said selected time displaced signals.

2. Apparatus for recording a plurality of cyclically repetitive time displaced signals as a bar graph comprising a recorder having ordinate and abscissa drive means, multiple adjustable means for gating said time displaced signals during selected time intervals, means responsive to each gating operation for producing a signal suitable for advancing said abscissa drive means a unit increment, switch means connected to receive said last-named signals and said gated time displaced signals, said switch means including means for connecting said gated time displaced signals to said recorder ordinate drive means and connecting said abscissa advance signal to said abscissa drive means in a first position of the switch, and means for verifying the selection of said time displaced signals and the adjustment of said multiple gate means by connecting a source of energy adapted to actuate said abscissa drive means at a constant rate with respect to time and connecting said gated time displaced signals and said abscissa advance signals to actuate said ordinate drive means in opposite directions in a second position of the switch, whereby to record a graphic representation of the operation of said multiple gate means and said automatic advance means relative to said selected time displaced signals.

3. Apparatus for recording a plurality of cyclically repetitive time displaced signals as a bar graph comprising a recorder having ordinate and abscissa drive means, multiple adjustable means for gating said time displaced signals during selected time intervals, means responsive to each gating operation for producing a signal suitable for advancing said abscissa drive means a unit increment, switch means connected to receive said last-named signals and said gated time displaced signals, said switch means including means for connecting said ungated time displaced signals to said recorder ordinate drive means and connecting a source of energy to said abscissa drive means to actuate the abscissa drive means at a constant rate with respect to time in a first position of the switch, means for verifying the selection of said time displaced signals and the adjustment of said multiple gate means by connecting said gated time displaced signals and said abscissa advance signals to said ordinate drive means in a second position of said switch, the signal fed to said abscissa drive means remaining as in said first position, and means for connecting said gated time displaced signals to said recorder ordinate drive means and connecting said abscissa advance signal to said abscissa drive means, in a third position of said switch, whereby said selected and verified time displaced signals are recorded as ordinate displacements separated by unit abscissa increments regardless of the time interval between signals.

4. Recording apparatus as defined in claim 3 and including gate means adjusted to select a zero signal level between said time displaced signals, said zero signal being impressed upon said recorder ordinate drive means through the third position of said switch means, whereby to provide a recorded baseline reference.

No references cited.